United States Patent [19]

Holzer

[11] 3,727,135

[45] Apr. 10, 1973

[54] ADAPTIVE CODE MODULATION IMPROVEMENT IN DIGITAL CODE MODULATORS

[75] Inventor: Johann Holzer, Elberon, N.J.

[73] Assignee: The United States of Americ as represented by the Secretary of the Army

[22] Filed: Apr. 27, 1971

[21] Appl. No.: 137,902

[52] U.S. Cl. ....................325/38 B, 178/68, 332/11 P

[51] Int. Cl. ..........................................H03k 13/22

[58] Field of Search .................325/38 R, 38 A, 38 B, 325/62, 159; 340/347 DD; 332/11 R, 11 P

[56] References Cited

UNITED STATES PATENTS 3,582,784 6/1971 Gaunt, Jr. ..........................325/38 B 3,462,686 8/1969 Shutterly............................325/38 B 3,402,352 8/1968 Lerner ...............................325/38 B

*Primary Examiner*—Benedict V. Safourek

*Attorney*—Harry M. Saragovitz, Edward J. Kelly, Herbert Berl and Arthur L. Bowers

[57] ABSTRACT

Digital code modulators are improved by addition of feedback means for adaptive code modulation to continuously match the dynamic range of the digital decoder to the dynamic range of the input signal. There is derived from the signal generated locally in the decoder a quantity representative of the average rate of change in the input signal over an immediately preceding short time interval, and this quantity is fed back to adapt the magnitude of a reference input to the decoder.

4 Claims, 3 Drawing Figures

INVENTOR,
JOHANN HOLZER

BY: Arthur L. Bowers
AGENT
Harry M. Saragovitz,
Edward J. Kelly & Herbert Berl
ATTORNEYS.

ADAPTIVE CODE MODULATION IMPROVEMENT IN DIGITAL CODE MODULATORS

BACKGROUND OF THE INVENTION

After it was discovered that digital code transmission of information could overcome shortcomings in the earlier systems in which the information signal to be transmitted modulates the amplitude or phase of sinusoidal waveforms or the amplitude, width or position of successive pulses, efforts have been made to improve upon digital code modulation. Continuous variation of the parameters is the common denominator of the earlier systems but continuous variation has a significant failing deriving from distortion and interference effects. When signal energy propagates, not only is there attenuation, there is also distortion and interference effects such as atmospheric noise, cross talk, and signal level variation. Long distance transmission requires repeaters to amplify signal strength at distance intervals. The distortion and interference effects are amplified along with the signal. Since the signal is not favored over the distortion and interference effects at each repeater, these effects, collectively termed noise are cumulative and increase relative to the signal; where the transmission path is long enough or is beset with enough interference and the signal plus noise is repeated enough, the signal is swamped by the noise. In digital code transmission, noise is not cumulative.

In digital code transmission, modulation of a parameter is carried out in a discrete number of quantizing steps in that parameter. If the repeater or receiver is accurately synchronized, it opens its gate at the instants digital pulses are due and makes an identification decision as to the particular discrete step of the parameter represented by each received pulse. Although the signal in digital code transmission is attenuated and picks up noise from distortion and interference effects, each pulse can be identified provided it is not overwhelmed in propagation. The repeater transmits a duplicate of the identified detected pulse. Thus there is virtually no accumulation of noise from repeater to repeater. In the simplest digital code modulation system there are two choices, pulse or no pulse and the repeater detects at each pulse interval, the presence or absence of an incoming pulse. The transmitter converts a continuous signal into a binary pulse train. One cost is that some noise is introduced unavoidably onto the information signal by the quantizing step. Another cost incurred for digital code transmission is that the required bandwidth is much greater than the bandwidth required for continuous signal transmission carrying the same information.

A problem in digital code modulation is that its dynamic range is not often adequate for the dynamic range of the modulating signals. Instantaneous compandors, syllabic compandors, and constant volume amplifiers have been used for reducing the dynamic range of input modulating signals. However, compandors and constant volume amplifiers introduce distortion besides being too costly.

The problem of dynamic range in digital transmission becomes more evident from careful consideration of the delta modulation type of digital transmission. In delta modulation, the information signal is sampled in time and the difference in amplitude between each pair of consecutive samples is binary coded. A comparator and decision circuit which is the heart of the transmitter, emits 1 and 0 binary output pulse train. The output binary pulse train also is fed back in the transmitter to an integrating network in the form of fixed amplitude positive or negative pulses to produce a locally generated approximation signal. The approximation signal is compared with the original signal. If the approximation signal is smaller than the input signal, a pulse is sent out by the transmitter representing binary 1, but if the approximation signal is larger than the input signal, the pulse is suppressed representing binary 0. Distortion occurs if the approximation signal in the transmitter and thus in the receiver too do not follow the dynamic range of the original signal.

Therefore, it is the object of this invention to eliminate disparity between the dynamic range of digital code modulators of communication equipments and the dynamic range of modulating signals.

A further object is to match the dynamic range of the digital decoder to that of the input intelligence signal.

SUMMARY OF THE INVENTION

These and other objects are accomplished with adaptive code modulation techniques. These techniques are applicable to digital code modulation systems generally e.g. delta code modulation, differential pulse code modulation, and pulse code modulation, wherein the digital code modulation system includes, in part, a decoder and a reference source. The invention concerns negative feedback from the output of the decoder to an amplifier in the reference source so that the output of the reference source is continuously adapted to the dynamic range of the intelligence signal.

DETAILED DESCRIPTION OF THE PREFERRED EMBODIMENT

Figure 1:
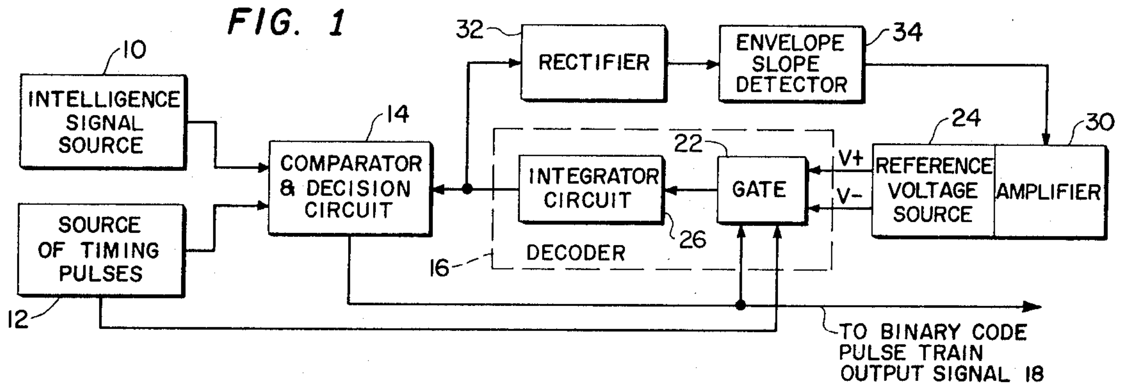
FIG. 1 is a block diagram of a delta code modulation transmitter modified in accordance with this invention.

FIG. 1 illustrates application of the principles of this invention to well known systems of delta modulation. Essential features of delta modulation are discussed in simple terms in Philips Technical Review, Vol. 13, No. 9, Mar. 1952, pages 237–245. At the transmitter, the waveform from the intelligence signal source 10 is sampled periodically in the multifunctional circuit combination labeled comparator and decision circuit 14, under the control of timing pulses from the source 12. Another input to the circuit 14 is a locally generated waveform from decoder 16 that is an approximation of the signal intelligence waveform but which lags slightly. The circuit 14 compares the levels of the two waveform inputs during each timing pulse and on the basis of such comparisons generates a binary code pulse train 18. The binary code pulse train is the output signal emitted by the transmitter.

Figure 2:
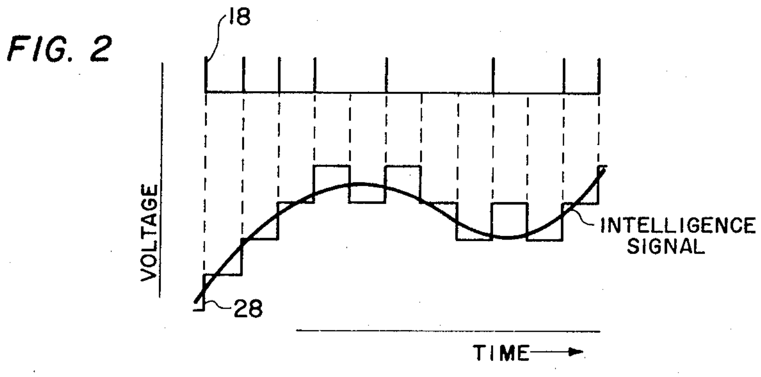
FIG. 2 is a graphical showing of voltage versus time of the relationships among the input intelligence signal, binary code pulse train output signal and the locally generated echelon curve.

The binary code pulse train 18 is similarly processed in the transmitter and at the receiver. The decoder 16 includes a gate circuit 22 which is coupled to the two output terminals of a reference voltage source 24 that provides constant voltage levels of equal but opposite polarity +V and −V. The gate circuit 22 delivers either a +V or a −V voltage step to integrator circuit 26 under the control of the binary code pulse train 18. When the gate receives a pulse as opposed a no-pulse it delivers a voltage step equal to +V at its output and when it receives a no pulse, it delivers a voltage step equal to −V at its output. The output of gate circuit 22 is an echelon curve 28 of successive equal-width and equal-height voltage steps illustrated in FIG. 2. The gate circuit 22 is triggered by the timing pulses so as to respond to each no-pulse as well as to each pulse. In the integrator circuit 26, the stepped echelon curve is converted to the locally generated waveform which is coupled into the circuit 14. The functions performed by gate 22, reference 24, and integrator 26 are matched by corresponding functions performed at the receiver, all well known in the art.

Delta modulation at its best is accompanied by noticeable quantizing noise; if the intelligence transmitted is voice, the noise is a clearly audible hiss. When the volume control is adjusted, the hiss varies in proportion to the signal. However, in addition to quantizing noise, there is a raspiness quality that degrades the message if the +V and −V steps are too small to follow the intelligence signal waveform and the resolution of the message is poor and incomplete if the step size is too large to follow the comparatively smaller rapid changes in the signal waveform. To reduce the raspiness or to improve the resolution, the reference source 24 is provided with amplifier means 30 to vary the size of the voltage steps at the output of gate 22 to overcome the conditions described. A full wave rectifier 32 and an envelope detector 34 are connected as a feedback circuit between the output of integrator 26 and the amplifier 30. The envelope detector 34 is designed to detect the average slope of the modulating signal of a preceding short time interval, i.e. slightly less than syllabic rate. The gain for the amplifier for optimum performance needs to be arrived at by trial; initially the amplifier gain is set so that +V and −V are about four times the short time average where the signal transmitted is speech.

Figure 3:
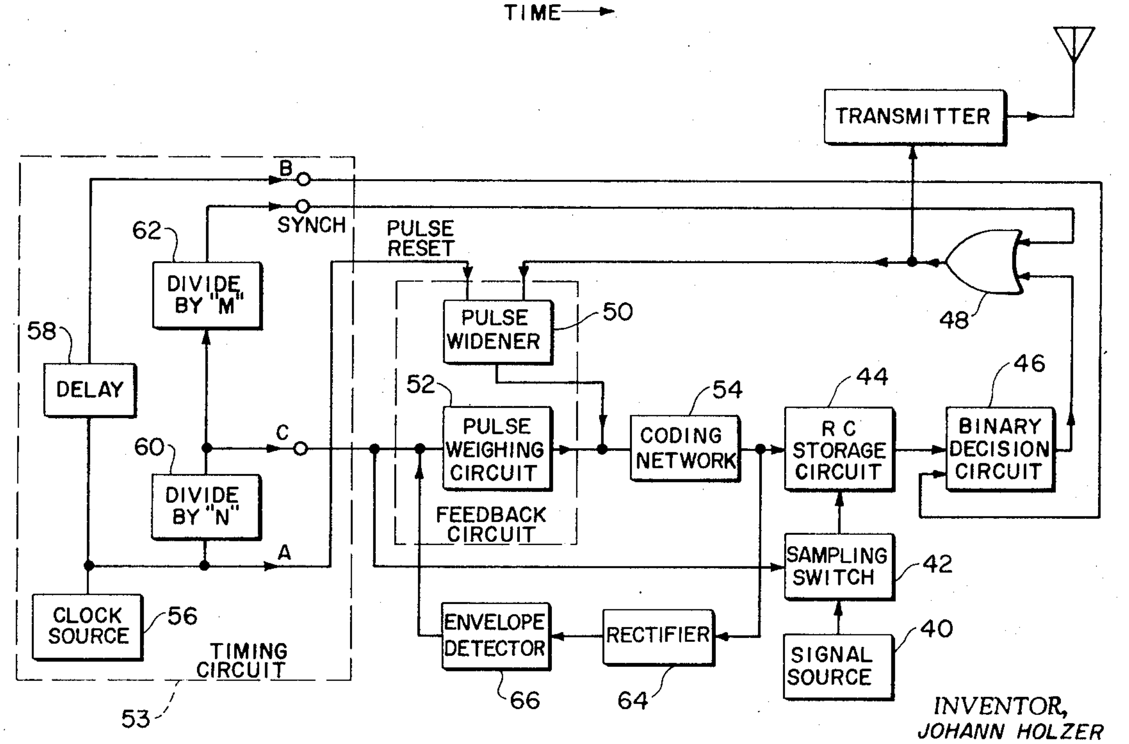
FIG. 3 is a block diagram of a differential pulse code modulation system modified in accordance with the principles of this invention.

FIG. 3 shows the differential pulse code modulator circuit of FIG. 1 of U.S. Pat. No. 3,225,315 issued to the same inventor and modified for adaptive code modulation in accordance with the principles of this invention. The reference characters are changed by plus 30 units. As described in the patent, the input signal to be transmitted from source 40 is sampled periodically through sampling switch 42 and coupled to storage circuit 44 where the waveform is smoothed. The output of storage circuit 44 is a waveform which contains a delayed and attenuated approximate replica of the sampled input waveform. Binary decision circuit 46 produces either a pulse or no pulse at prescribed trigger intervals, depending on the level of the signal provided at its input. If, when triggered, the input voltage to binary decision circuit 46 is less than a prescribed voltage level, an output pulse is produced. Conversely, if the input voltage to binary decision circuit 46 is greater than the prescribed voltage level, there is no pulse output. The pulse and no pulse outputs of decision circuit 46 are applied through OR gate circuit 48 to a pulse widener circuit 50 which provides negative or positive voltage levels and selectively gate signals derived from pulse weighing circuit 52 to coding network 54. The input of pulse weighing circuit 52 has an RC network that is responsive to pulses spaced at preselected time intervals corresponding to the signal sampling pulses and the output of pulse weighing circuit 52 has a phase-splitter to which is applied the exponentially decaying voltage derived across the input RC network. It is the specific function of pulse weighing circuit 52 to produce a pair of oppositely phased exponentially decaying voltages. The polarity of the exponentially decaying voltage applied to coding network 54 is controlled by the polarity output of pulse widener circuit 50. The coding network 54 includes an RC network of the same time constant as that of RC storage circuit 44 and converts the voltage function applied at the input thereof to a current function and includes an integrator RC circuit for integrating the current function. The instant sampled input signal at RC storage circuit 44 is algebraically added to the integrated voltage remaining at the output of the coding network 54 which is an indication of the level of the preceding sampled input signal. The difference or error signal is applied as the input to binary decision circuit 46. In effect, the pulse widener circuit 50 and pulse weighing circuit 52 comprise a feedback network to reduce the error or difference between the previously sampled signal reconstructed across the coding network 54 and the next following sampled signal developed across the RC storage circuit 44.

The timing circuit 53 for the transmitter includes master clock pulse source 56 that provides a train of timing pulses (A) which are delivered to and reset pulse widener circuit 50 and are delivered through delay circuit 58 to trigger binary decision circuit 46. Delay circuit 58 delays slightly the timing pulses (B) from master clock source 56 to allow resetting of pulse widener circuit 50 before triggering binary decision circuit 46. The timing pulses from source 56 are divided by a factor N in divider circuit 60 and the output pulse train therefrom (C) is supplied as timing pulses to both the pulse weighing circuit 52 and sampling switch 42. To assure proper synchronization between the timing sources for the transmitting and receiving systems, a synchronization pulse is inserted as one input to OR gate 48. The signal pulse is supplied by means of a second divider circuit 62 into which is coupled the output of divider circuit 60.

A full wave rectifier 64 is connected to the output of coding network 54 and an envelope detector 66 feeds back the resultant waveform to the input of pulse weighing circuit 52 to control the amplitude of pulses (C) entering pulse weighing circuit 52 to match dynamic range.

In the two examples, similar loops of rectification, envelope detection, and amplification of the reference voltage when applied to the decoder result in a better approximation of the original signal.

The principles of adaptive code modulation illustrated in the described embodiments are applicable to digital code modulators generally where they include a comparator-decision circuit that accepts the input intelligence signal and the locally generated waveform and provides the coded pulse train output, a decoder responsive to the coded pulse train output to provide the locally generated signal to the comparator-decision circuit, and a reference voltage source coupled to the decoder. The intelligence signal input to the comparator-decision circuit may be a continuous waveform or a sampled waveform. The reference may provide an electrical value or a group of electrical values. In each digital code modulator which can be improved by this invention, a locally generated signal representative of the input signal and corresponding to the output code pulse train is either directly available or can be derived. This locally generated signal is an approximation of the input intelligence signal and its instantaneous, syllabic, or long term behavior is similar to that of the input intelligence signal. From the locally generated signal, a magnitude continuously representative of the instantaneous, syllabic, or long time magnitude of the input intelligence signal is derived, and the derived magnitude controls the reference voltage. By controlling the reference voltage in accordance with characteristics of the input intelligence signal, the coding process is adapted to the input signal. Also, by deriving from parameters of the locally generated signal a magnitude representative of the magnitude of the signal and by correlating the reference voltage with the representative magnitude, the decoder will accept the input intelligence signal at the most favorable level at all times, always producing an optimum reconstruction of the input intelligence signal at the output of the decoder.

While the invention has been described in connection with an illustrative embodiment, obvious modifications thereof are possible without departing from the spirit of the invention. Accordingly, the invention should be limited only by the scope of the appended claims.

What is claimed is:

1. In combination with a digital code modulator having a source of reference voltage for providing positive and negative output voltages that are continuously of equal magnitude, a decoder means, and a comparator and decision circuit, wherein the comparator and decision circuit has two inputs and one output, one input coupled to an intelligence signal source and the other input for locally generated signal from the decoder, for providing at the output a coded pulse train representative of difference between the two inputs at periodic intervals, and wherein the decoder has two inputs and an output that is coupled to the comparator and decision circuit, one of the decoder inputs being coupled to the output of comparator and decision circuit and the other input being coupled to the output(s) of the reference source, the improvement which comprises said source of reference voltage being provided with an adjustable gain amplifier for adjustably amplifying the magnitude of the output voltages relative to a preselected gain level, a feedback circuit between the output of the decoder and the amplifier to adjust the magnitude of the output voltages of the reference source in response to change in output from the decoder over a predetermined time interval to match continuously the dynamic range of the output of the decoder to the dynamic range of the intelligence signal, said feedback circuit including a full wave rectifier connected to the output of said decoder and an envelope detector coupled to the output of said full wave rectifier and the gain controlling input of said amplifier for adjusting the gain of the amplifier relative to said preselected gain level in accordance with the average slope of the output of the decoder over a preceding time interval representative of the instantaneous, syllabic or long time magnitude of the input intelligence.

2. The combination defined in claim 1 wherein the digital code modulator is a delta modulation system.

3. The combination defined in claim 2 wherein the decoder includes a gate circuit and an integrator circuit, the gate circuit being responsive to the coded pulse train from the comparator and decision circuit to couple either the positive or negative outputs of the reference source to the integrator circuit and the integrator circuit delivers a substantial replica of the intelligence signal waveform to the comparator and decision circuit but lagging slightly relative to the intelligence signal input.

4. The combination defined in claim 1 wherein the digital code modulator is a differential pulse code modulator system.

* * * * *